United States Patent
Lu Hill et al.

(10) Patent No.: US 11,482,126 B2
(45) Date of Patent: *Oct. 25, 2022

(54) AUGMENTED REALITY SYSTEM FOR PROVIDING MOVEMENT SEQUENCES AND MONITORING PERFORMANCE

(71) Applicant: ExtendView Inc., Los Angeles, CA (US)

(72) Inventors: Douglas Lu Hill, Los Angeles, CA (US); Priscilla Lu, Los Angeles, CA (US)

(73) Assignee: ExtendView, Inc., Los Angeles, CA (US)

( * ) Notice: Subject to any disclaimer, the term of this patent is extended or adjusted under 35 U.S.C. 154(b) by 968 days.

This patent is subject to a terminal disclaimer.

(21) Appl. No.: 16/150,125

(22) Filed: Oct. 2, 2018

(65) Prior Publication Data

US 2019/0103033 A1  Apr. 4, 2019

Related U.S. Application Data

(60) Provisional application No. 62/567,514, filed on Oct. 3, 2017.

(51) Int. Cl.
 *G09B 5/02* (2006.01)
 *G06T 11/60* (2006.01)
 (Continued)

(52) U.S. Cl.
 CPC ............ *G09B 5/02* (2013.01); *G06T 7/246* (2017.01); *G06T 11/60* (2013.01); *G06T 13/40* (2013.01);
 (Continued)

(58) Field of Classification Search
 CPC .. G09B 19/00; G09B 19/003; G09B 19/0038; G09B 5/02; G06T 7/246; G06T 2207/30196
 See application file for complete search history.

(56) References Cited

U.S. PATENT DOCUMENTS 10,054,074 B2   9/2018 Hoang et al.
10,065,074 B1 * 9/2018 Hoang ................ G09B 19/003
(Continued)

OTHER PUBLICATIONS

Final Office Action, U.S. Appl. No. 16/150,110, dated May 6, 2020, 25 pages.

(Continued)

*Primary Examiner* — Robert J Utama
*Assistant Examiner* — Correll T French
(74) *Attorney, Agent, or Firm* — Nicholson DeVos Webster & Elliott LLP

(57) ABSTRACT

Techniques are disclosed for capturing and monitoring object motion in an AR environment. A first movement sequence may be received. The movement sequence may be an assigned movement routine. Image data of at least one target may be captured and the image data can be augmented with a training object to generate augmented training data. The training object can be caused to perform the first movement sequence. The motion of the at least one target can be recorded relative to the training object using the image data and one or more sensors deployed to the at least one target. A progression of therapeutic routines may be shown to the user depending on how the user's therapy is progressing. A second movement sequence can be received and the training object can be caused to perform the second movement sequence.

20 Claims, 10 Drawing Sheets

(51) Int. Cl.
  *G06T 7/246* (2017.01)
  *G09B 19/00* (2006.01)
  *G06V 40/20* (2022.01)
  *G06T 13/40* (2011.01)

(52) U.S. Cl.
  CPC ............. *G06V 40/23* (2022.01); *G09B 19/00* (2013.01); *G09B 19/003* (2013.01); *G09B 19/0038* (2013.01); *G06T 2207/30196* (2013.01)

(56) References Cited

U.S. PATENT DOCUMENTS

| | | |
|---|---|---|
| 10,134,296 B2 | 11/2018 | Anderson |
| 10,846,934 B2* | 11/2020 | Lu Hill ................ G06T 19/006 |
| 11,049,321 B2* | 6/2021 | Lu Hill ..................... G06T 7/20 |
| 2008/0220941 A1 | 9/2008 | Shaw et al. |
| 2010/0173276 A1 | 7/2010 | Vasin |
| 2012/0206577 A1 | 8/2012 | Guckenberger et al. |
| 2013/0123667 A1* | 5/2013 | Komatireddy ..... G06K 9/00342 600/595 |
| 2013/0171596 A1* | 7/2013 | French ................... G09B 19/00 434/236 |
| 2014/0188009 A1 | 7/2014 | Lange et al. |
| 2015/0057966 A1* | 2/2015 | Winter ............... G09B 19/0038 702/141 |
| 2015/0098143 A1* | 4/2015 | Anderson .............. G03B 21/62 359/839 |
| 2015/0099252 A1* | 4/2015 | Anderson ............. G06T 7/0014 434/257 |
| 2017/0055851 A1* | 3/2017 | Al-Ali .................. A61B 5/7264 |
| 2018/0242920 A1 | 8/2018 | Hresko et al. |

OTHER PUBLICATIONS

Non-Final Office Action for U.S. Appl. No. 16/150,110, dated Dec. 27, 2019, 16 pages.
Non-Final Office Action for U.S. Appl. No. 16/150,120, dated Feb. 4, 2020, 32 pages.
Notice of Allowance, U.S. Appl. No. 16/150,110, dated Oct. 7, 2020, 20 pages.
Final Office Action, U.S. Appl. No. 16/150,120, dated Jul. 10, 2020, 40 pages.
Non-Final Office Action, U.S. Appl. No. 16/150,110, dated Dec. 27, 2019, 16, pages.
Non-Final Office Action, U.S. Appl. No. 16/150,120, dated Feb. 4, 2020, 32 pages.

* cited by examiner

AUGMENTED REALITY SYSTEM FOR PROVIDING MOVEMENT SEQUENCES AND MONITORING PERFORMANCE

CROSS-REFERENCE TO RELATED APPLICATIONS

This application claims the benefit of U.S. Provisional Application No. 62/567,514, filed Oct. 3, 2017, which are hereby incorporated by reference.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD OF THE INVENTION

The disclosed embodiments relate generally to techniques for augmented reality (AR) guides and more particularly, but not exclusively, to an AR system for providing movement sequences and monitoring performance.

BACKGROUND

Augmented reality (AR) allows a user's view of the real world to be superimposed with computer generated images (e.g., virtual images) and other augmented information. The augmented information can include visual, auditory, haptic, or other sensory information that is provided to the user as they navigate an AR environment. This allows for additional data linked to real world objects to be displayed or otherwise provided to the user.

SUMMARY

Techniques are disclosed for capturing and monitoring object motion in an AR environment. A first movement sequence may be received. The movement sequence may be an assigned movement routine. Image data of at least one target may be captured and the image data can be augmented with a training object to generate augmented training data. The training object can be caused to perform the first movement sequence. The motion of the at least one target can be recorded relative to the training object using the image data and one or more sensors deployed to the at least one target. A progression of therapeutic routines may be shown to the user depending on how the user's therapy is progressing. A second movement sequence can be received and the training object can be caused to perform the second movement sequence.

DETAILED DESCRIPTION

The invention is illustrated, by way of example and not by way of limitation, in the figures of the accompanying drawings in which like references indicate similar elements. It should be noted that references to "an" or "one" or "some" embodiment(s) in this disclosure are not necessarily to the same embodiment, and such references mean at least one.

As used herein, the following terms may be used according to the following definitions:

Screen View: The view shown to a user on an augmented reality (AR) display device.

Camera View: A front view of the user, with camera facing the user.

Eye View: A view that approximates the user's view as seen from his/her own eyes.

Mirror View: Any view of the user which represents a view of the user as if viewed in a mirror.

Shadow View Object: A wireframe or simplified view of a target being captured in image data, such as a user, which emulates the actions of the target in real time.

Tutor Guide: A training object which may be displayed and prompts the user to perform particular actions or movements.

Augmented Object: Any object imposed on the Screen View. The shadow view object is an example of an augmented object.

Movement Sequences: A series of motions which may be performed by the tutor guide or other training object. In some embodiments, the movement sequences may represent, e.g., physician prescribed physical therapy sessions for specific conditions (tennis elbow, carpel tunnel, frozen shoulder, etc.), exercises (yoga, Pilates, aerobics, etc.), or any other series of motions.

Gaming Sequences: Additional movement sequences associated with each of the movement sequences that help enhance the intensity, and also encourage users to extend the endurance of the specific exercises.

Figure 1:
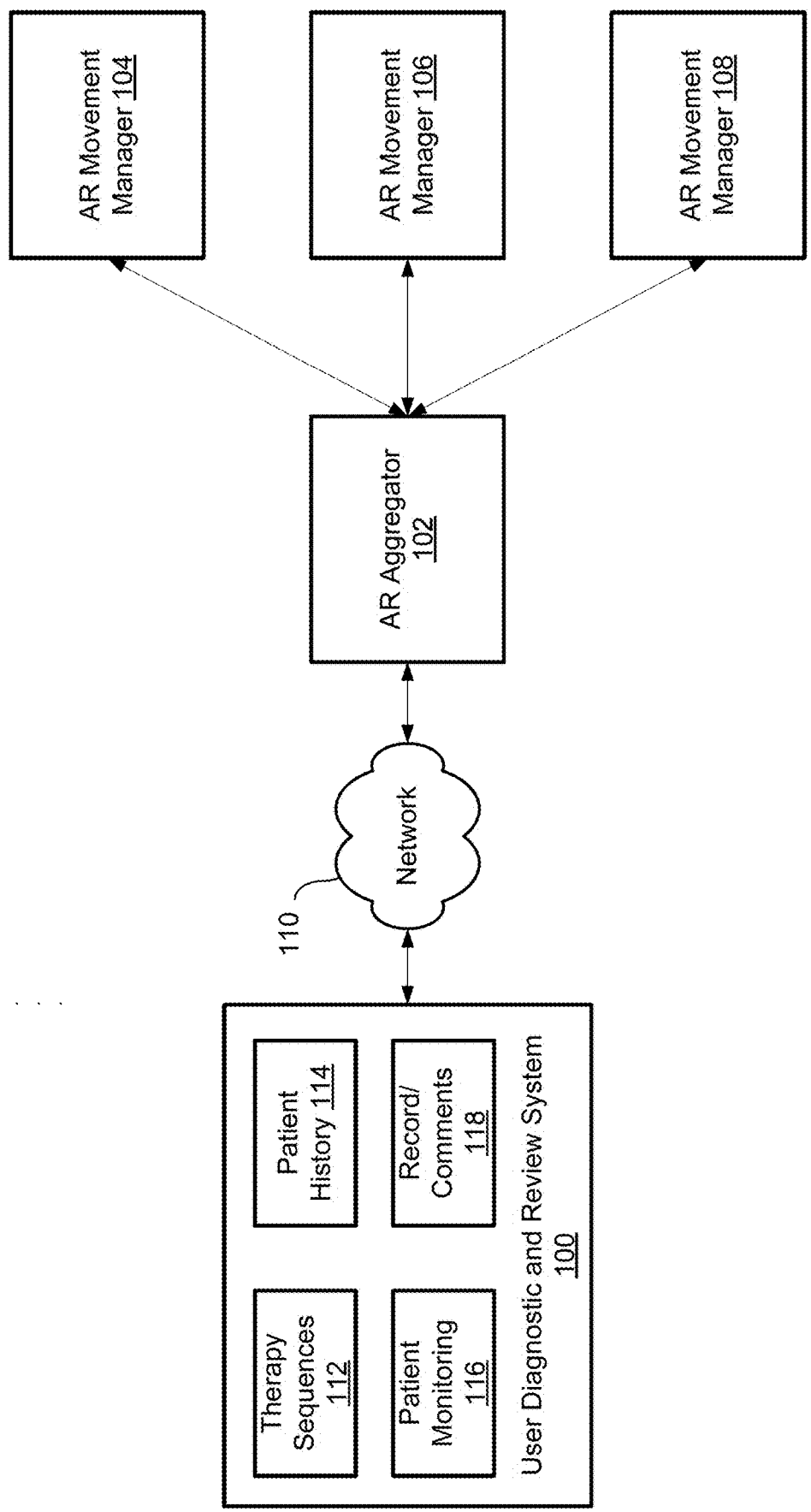
FIG. 1 illustrates an example of an augmented reality movement tracking system, in accordance with various embodiments of the present invention.

FIG. 1 illustrates an example of an augmented reality (AR) movement tracking system, in accordance with various embodiments of the present invention. As shown in FIG. 1, a user diagnostic and review system 100 can be used by an instructor or other user to provide and monitor movement sequences (e.g., therapies, exercises, or other motion) to a plurality of end users. The user diagnostic and review system 100 can communicate with an AR aggregator 102 over a network 110. The AR aggregator 102 can communicate with a plurality of local AR movement managers 104-108. In some embodiments, local AR movement managers 104-108 can communicate directly with the user diagnostic and review system. Each local AR movement manager 104-108 may represent a different user or a different location. An instructor or other user can define therapy sequences, such as various movement sequences specific to the type of injury. The therapy sequences can be distributed to the specific user's local AR movement manager via the AR aggregator. Each local AR movement manager can report the results of each user performing the therapy sequences back to the user diagnostic and review system 100 via AR aggregator 102. Results can be stored in user history 114. The results can be evaluated and user progress can be entered in user monitoring 116. User records and comments may also be maintained, providing references for future changes to the therapy sequences.

Figure 2:
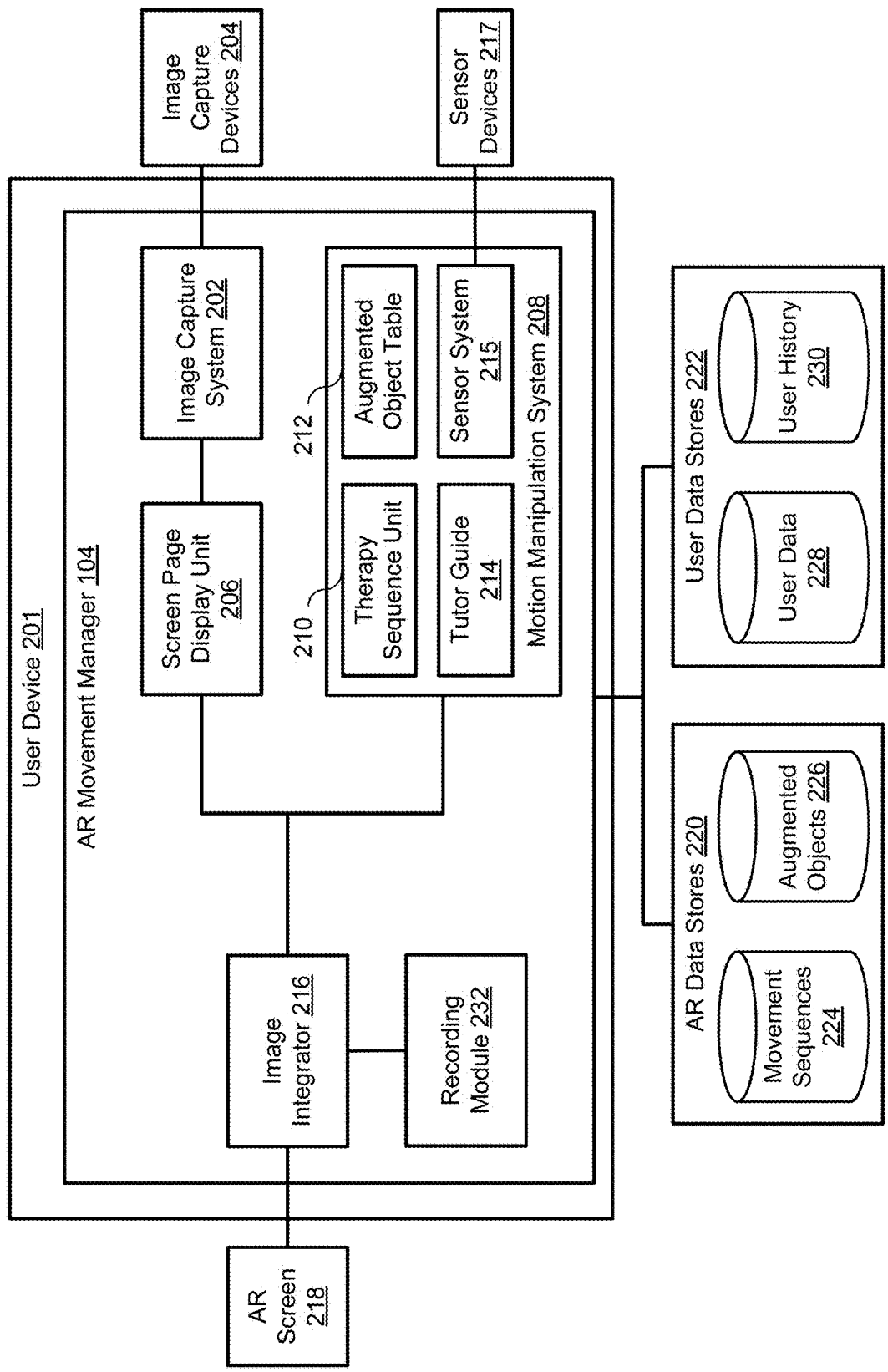
FIG. 2 illustrates an example of a camera and sensor-based object tracking and monitoring system, in accordance with various embodiments of the present invention.

FIG. 2 illustrates an example of a camera and sensor-based object tracking and monitoring system, in accordance with various embodiments of the present invention. As shown in FIG. 2, a user device 201, such as a smartphone, laptop, desktop, or other computing device may include an augmented reality (AR) movement manager 100. The AR movement manager can include an image capture system 202 which may capture image data from one or more image capture devices 204 which are directed at or around a target. The image capture devices may be deployed to the target, e.g., attached to the user's head providing an eye-view which approximates what the user sees, and/or deployed in front of the target, providing a camera view or mirror view of the target. In some embodiments, the camera in front of (or behind, or at another position relative to) the target may be placed at a specified distance and height. In some embodiments, the target may be a user, such as a user being instructed to perform a series of movements. The image data may be analyzed by the image capture system 202 to identify feature points of the target and track the displacement of those feature points in the image data as the target moves. Alternatively, in some embodiments, sensor devices 217 may be deployed to the target. As discussed further below, the sensor devices 217 may include accelerometers, gyroscopes, or other sensor modules, allowing the sensors to continuously monitor the position, angle, acceleration, etc. of different portions of the target. The sensor devices may provide this movement data in real time to sensor system 215. This movement data may be passed in real time to screen page display (SPD) unit 206. The SPD may generate a page by page image in real time showing the delta difference in motion of the shadow view and any augmented objects imposed on the screen view. Initially, a calibration object may be displayed which instructed the target to perform a series of motions to allow the image capture system to identify feature points of the target. In some embodiments, an image integrator 216 may augment the image data captured by image capture system 202 with the shadow view and other augmented objects, such as the tutor guide. In some embodiments, each user's performance of a movement sequence can be recorded by recording module 232 for later review.

In some embodiments, a motion manipulation system (MMS) can determine the motion of augmented objects based on the defined movement sequences and the target's shadow view motions. The MMS may include an augmented object table (AOT) 212 which includes a list of available augmented objects that can be displayed and imposed on the Screen View and displayed by the SPD in real time. The AOT may be extensible by adding additional objects to augmented objects data store 226 and adding entries for the new objects to the AOT. Each entry may include an identifier for the object and a storage location. The MMS may also include a sequence unit (SU) 214 which can create real time response to motion of the shadow view based on the Movement Sequences defined in data store 224. The SU may cause augmented objects, such as the tutor guide to perform more or fewer motions depending on the user's progress, as represented by the motion of the shadow view.

In some embodiments, augmented reality (AR) system 104 may access AR data stores 220 and user data stores 222. User data stores 222 can include user data store 228 which includes confidential data, such as medical history, doctor comments and record reporting (e.g., name, therapy prescription, exercise regiments, collected history of exercises completed, and levels of accuracy/conditions attained with dates, time, duration, doctor's report and comments, etc.). A screen view data store 230 may include screen views which are dynamically created from screen capture and retained to provide continuous page changes as the augmented object images changes position.

In some embodiments, AR data stores 220 may include a movement sequences data store 224 which may include a series of pre-programmed exercises or other movements as prescribed by a physician, therapist, instructor, or other entity. The exercise sequences can use a Tutor Guide figure or other augmented object to illustrate the movements in the Sequence Unit's database 224—these form the foundation movements that drives the real-time response of the "Tutor Guide" figure which is illustrated by the Tutor figure shown in the Augmented Reality screen which the User is instructed to follow. As discussed, the AR data stores may also include an augmented object data store which includes augmented objects that can be selected by the users to help guide its movements. In some embodiments, the user's shadow view object may be stored in the augmented objects data store after it is created during calibration. Calibration may be used to determine proportional height, length of limbs and angle positions based on various alignment parameters.

As discussed above, the image capture system can capture motion of the shadow view object, by identifying the movement of the target in the sensor data. Calculation of this movement data may be performed in real time. This real-time movement data may be passed to the SPD. The SPD integrates information from capture system that captures the real-time motion of the user which then drives the change in positions of the shadow view shown AR screen 218. In some embodiments, additional augmented objects may be displayed which respond to the motion of the user and based on the defined movement sequences in AR data stores 220. The Motion Manipulation System (MMS) uses the information in the Sequences Unit (TSU) to respond in real time to the motion of the user guided by the prescription prompts from the Tutor Guides which shows where and how the movement should be done by the User based on the prescribed exercises included in data store 224.

At startup, the user can perform an initial calibration. This calibration phase ensures that the motion of users of different sizes is correctly identified by the system. Sensor data from a plurality of sensors positioned at different locations on that target may be recorded and analyzed to determine height, limbs and plumb-line (e.g., vertical angle) of the user. In some embodiments, during calibration portions of the user's body can be identified using a representation of the user shown in image data captured of the user performing a calibration movement sequence. For example, each portion of the body (e.g., each limb, torso, neck, head, etc.) represented in the images can be labeled with a tag. In some embodiments, the tag may include a color, with different colors assigned to each portion of the user's body. The tags may be applied to the image data by the system using a machine learning image analysis system or service implementing, e.g., object detection and/or segmentation techniques. In some embodiments, the tags may be manually applied to the image data by a user (either the current user, an instructor, doctor, therapist, or other user). For example, a user may outline different portions of the image data which show different portions of the user's body and assign a color to that portion. Once each portion of the user's body has been tagged, image processing techniques may be used to estimate the size of each portion, the users, height, plumbline, etc. The shadow view object may be rendered based on this calibration set. Once the calibration is complete, the user may then select a movement sequence based on duration, intensity, etc. A tutor guide and/or other augmented objects may be displayed in the image data allowing the user to perform the movements while observing any differential that exists between the user's motions and the prescribed motions.

Embodiments described herein may be implemented using a variety of computing systems as discussed further below. For example, AR screen 218 may include a head mounted display (HMD) providing stereoscopic views to the user, a projection system including one or more projectors to display AR and VR images on one or more display surface, or other display device. Although functional components are shown and described separately, this is for simplicity of explanation only. In various embodiments, AR movement manager 104 may be integrated into AR screen 218 (e.g., where an HMD includes computing resources to perform the AR processing described above). In some embodiments, AR screen 218 may represent a thin client device that is connected to AR movement manager 104 over one or more networks (e.g., an Ethernet network, a wireless network operating using an IEEE 802.11 suite of protocols, a mobile network, etc.). Similarly, AR and user data stores 220, 222 may be implemented as local data stores to AR screen 218 and/or AR movement manager 104, or may be accessible over one or more networks. AR movement manager 104 may be implemented on various computing systems such as a video game console, desktop, laptop, workstation, or other computing device. In some embodiments, AR movement manager 104 may be implemented in a cloud computing system including various remote computing resources that may be increased or decreased dynamically based on processing or other resource requirements.

Figure 3:
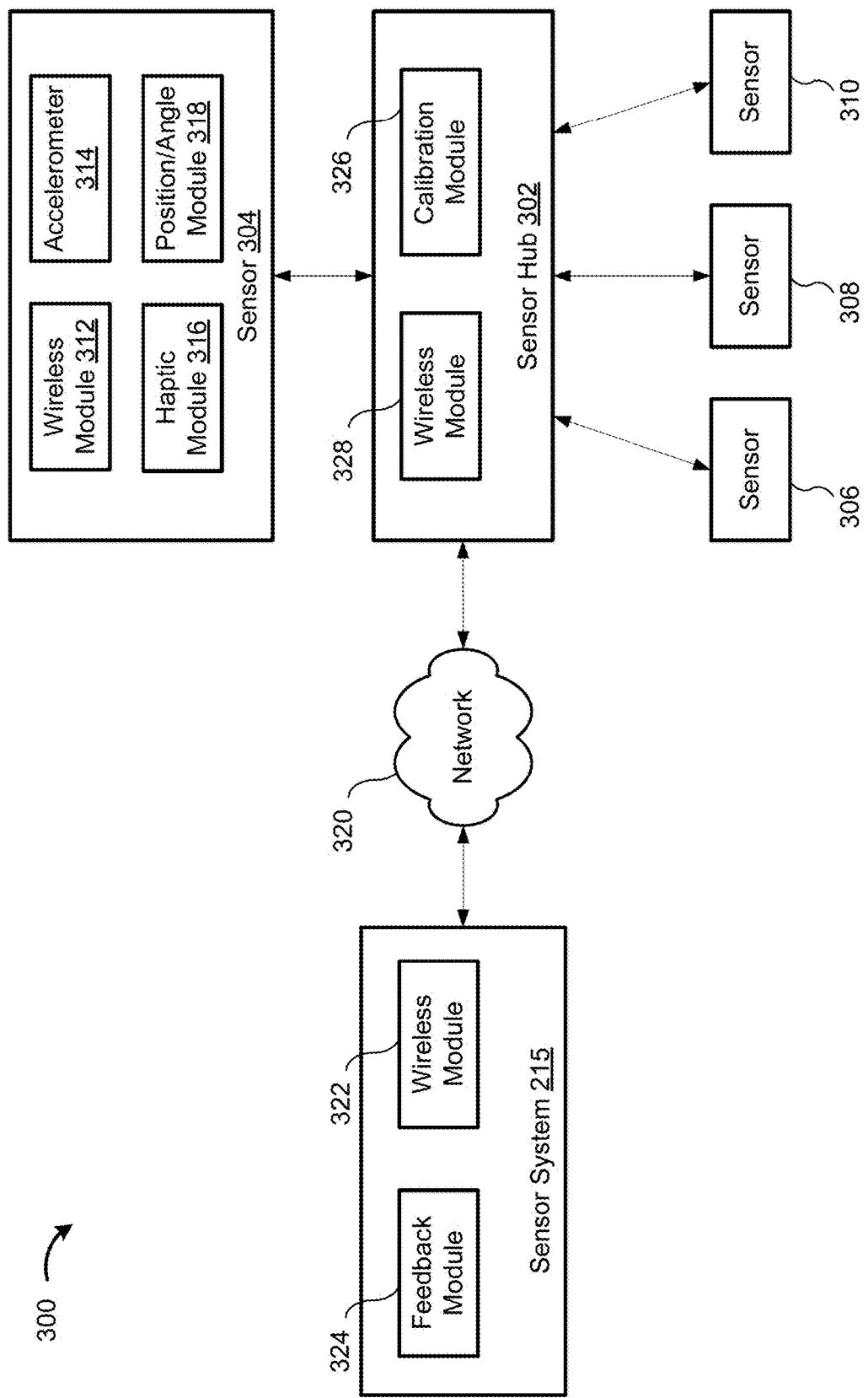
FIG. 3 illustrates an example of a sensor system, in accordance with various embodiments.

FIG. 3 illustrates an example 300 of a sensor system, in accordance with various embodiments. A sensor hub 302 can be deployed to a target (e.g., for a human target hung around the neck). The sensor hub can communicate with a plurality of sensors 304-310 that are also deployed to the target and located at various locations on the target. As shown in sensor 304, a sensor may include a wireless module for communicating with sensor hub 302, an accelerometer 314 for measuring the acceleration of the sensor and therefore the acceleration of the portion of the target to which the sensor is deployed, a haptic module 316, and a gyroscopic sensor 318 to determine positions and orientation. With these modules, each sensor can determine the acceleration, angle of incline, and height from the ground or other reference plane (e.g., in the case where the body or limbs are lifted off the ground or other surface; like sit ups or squats). The haptic module can provide feedback to the user to indicate that a sensor is out of alignment with the prescribed motion.

Each sensor can transmit continuously or at regular intervals, to the sensor hub 302. The sensor hub may include a calibration module, which it can use to connect to each sensor and determine where the sensor is located. For example, by determining the height from the ground and angle of incline of the sensor while at rest. Wireless module 328 enables the hub to communicate with each sensor and with sensor system 115 over network 320. Sensor system 115 can include a wireless module 322 and a feedback module 324. Feedback module 324 can instruct sensor hub to cause a particular sensor to provide feedback to the user, based on the location of the sensors relative to the prescribed motions.

In various embodiments, one or more sensors may remain attached to a target outside of any session (e.g., worn by the user outside of an exercise, physical therapy, or other movement session). Each sensor may record the movement of the target and provide feedback based on prior data collected about the movement of the target. As discussed, this feedback may include haptic feedback provided by a sensor which detects movement that is out of alignment, audible feedback, or any other sensory feedback detectable by the target. In some embodiments, each sensor may wirelessly upload the data to the sensor system through a wireless interface over one or more networks (e.g., a WiFi network, mobile network, or other wireless network). In some embodiments, the sensor hub may record and store movement data from each sensor collected outside of a session. This data may then be downloaded from the sensor hub at the next session, or periodically over a wireless network.

In some embodiments, the sensors worn outside of a session may be used to establish a baseline, or "normal," movement pattern or history of the target. In some embodiments, the sensors may receive movement pattern data based on the target's movement at a recent session. For example, one or more motions may be prescribed to the target to perform between sessions. Movement pattern data indicative of the prescribed motions (e.g., angle, position, speed, acceleration, etc.) for each sensor may be provided to the sensors (e.g., uploaded during a session). Outside of the session, the sensors may continue monitoring the target's movement and comparing those movements to the prescribed patterns and providing feedback. In some embodiments, the prescribed motions may include a plurality of progressively more difficult patterns. Based on the feedback, the sensors may automatically begin comparing the target's movements to a next pattern in the progression. For example, if the sensors determine that the number of movement errors detected is below a threshold value during a predefined period of time, the sensors may begin comparing the target's movements to the next pattern. Similarly, if the sensors determine that the number of movement errors detected is above a threshold value, the sensors may begin comparing the target's movements to a previous, or less difficult, pattern. As discussed, in some embodiments, the sensors may continuously or periodically upload movement data for the target outside of a session. Based on the uploaded movement data, new movement patterns may be pushed to the sensors (either directly or through the sensor hub) to be used for comparing the target's movement between sessions.

Figure 4:
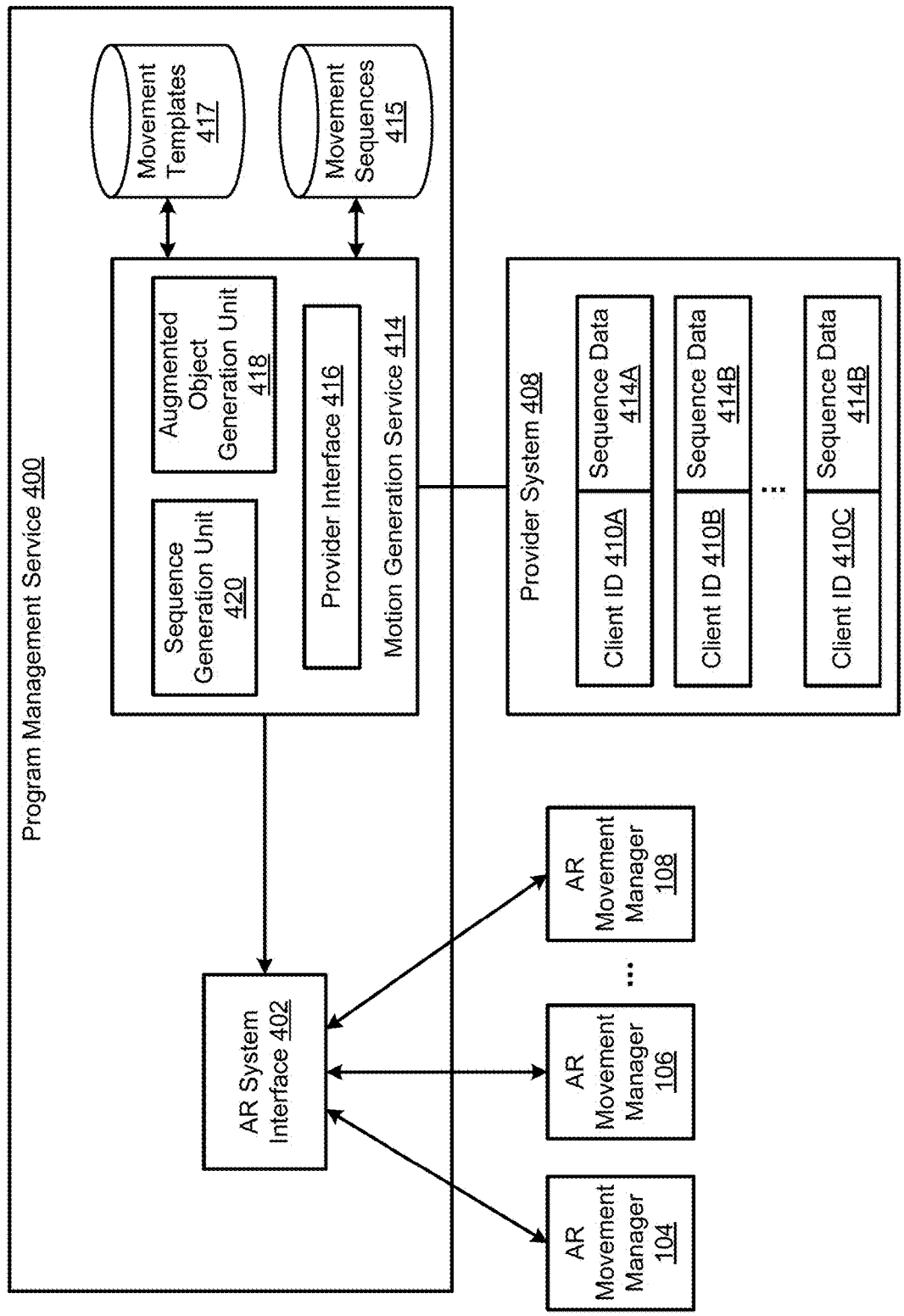
FIG. 4 illustrates an example of a program management service, in accordance with various embodiments of the present invention.

FIG. 4 illustrates an example of a program management service, in accordance with various embodiments of the present invention. As shown in FIG. 4, a program management service 400 can coordinate distribution of movement sequences (e.g., physical therapy, exercise instructions, etc.) from a provider system 408 to various connected AR movement managers 104, 106, 108. The program management service 400 can include an AR system interface 402, through which each AR movement manager can obtain new movement sequences, update existing movement sequences, or request new or different movement sequences.

In some embodiments, AR system interface 402 can provide access to movement sequences through each user device. Although the user interface is shown as part of program management service 400, each AR movement manager may provide the user interface as a graphical user interface or other user interface. The user can select from movement sequences that have been assigned to them or may search for available movement sequences to be performed. When a movement sequence is selected, the requirements of the movement sequence can be displayed. In some embodiments, a prelaunch phase can include an example of the movement sequence, such as a video demonstration, virtual demonstration, or other example of the movement. The user can then position the user device such that the user's motions are visible to the image capture device and perform calibration of the shadow view. Characteristics of the user's motion (e.g., speed, angle, repetitions, etc.) can be determined by the AR movement manager and those characteristics can be compared to an ideal form represented by the tutor guide or other augmented object. Any discrepancies in the user's movements (e.g., faster or slower than assigned, misaligned angle of movement, etc.) can be shown to the user as part of a performance history.

A provider system 408 may provide movement sequences to a plurality of different users using a plurality of different AR movement managers. For example, a doctor using provider system 408 may provide movement sequences to patients using AR movement managers 104, 106, and 108. In some embodiments, the provider system can provide movement data which may include a client ID 410A-410C and corresponding sequence data 412A-412C. Each client ID may correspond to a different user and each sequence data may characterize the movements to be performed by an augmented object, such as the tutor guide.

In some embodiments, program management service 400 can include a motion generation service 414. Motion generation service 414 can receive movement data from various provider systems 408 and generate augmented objects and movement sequences based on the movement data. The movement data may be received through a provider interface 416, which may be an application programming interface, web interface, or other interface. In some embodiments, provider system 408 may execute an application implementing a software development kit (SDK) provided by program management service 400. The sequence data 412 may describe one or more movement sequences (e.g., exercises, therapeutic movements, etc.). For example, the movement sequences may define movement over time for a plurality of spatial points of an object. Augmented object generation unit 418 can generate a visualization of the plurality of spatial points and their movement over time in the form of an augmented object. For example, image or video data of an avatar, such as tutor guide 114 or other augmented object. In some embodiments, a user of an AR movement manager may request a new augmented object be generated for a given movement sequence. The augmented object generation unit 418 can generate the new augmented object and provide it to the AR movement manager via AR system interface 402.

In some embodiments, provider interface 416 may include a web portal enables through which providers may access the program management service 400, e.g., using a username and password, or other login credentials. The provider can identify a particular user to assign one or more movement sequences to, or may make one or more movement sequences available to any user accessing the service 400. When selecting a particular user, the provider can view a user dashboard, which may indicate the user's performance in previously assigned movements as well as a history of successfully completed movements. A provider can select new movement sequences from various predefined movement sequences 415 or may create new movement sequences through the provider interface 414 using one or more movement templates 417. For example, each template may correspond to a movement of a different portion of a target (e.g., a user's arm, leg, neck, etc.). The provider can define a new movement sequence by setting a required repetition, frequency, duration, range of motion, etc. for each movement in the movement sequence. Once defined, the provider can save the movement sequence to movement sequence data store 415 and assign it to the user's schedule.

In some embodiments, the sequence data 412 received from a provider system 408 may include high resolution movement data (e.g., including movement data of having a high sampling rate and/or representing the motion of a high density of spatial points). However, given variation in the processing capabilities of a user device implementing an AR movement managers (e.g., ranging from a smart phone, to a video games console, to high performance consumer electronics), every system may not be capable of effectively rendering such movements. Accordingly, a sequence generation unit 420 can convert the sequence data 412 into a format appropriate for the AR movement manager receiving the movement sequence (e.g., to be stored in movement sequences database 124). For example, sequence generation unit 420 may downsample the sequence data prior to providing it to an AR movement manager. Additionally, or alternatively, sequence generation unit 420 may provide compression services to the sequence data to more effectively transmit the sequence data over one or more network connections to a given AR movement manager.

In some embodiments, sequence generation unit 420 may generate sequence data from image movement data. For example, the movement data provided by a provider system 408 may include image data (e.g., still image data, video data, etc.) which includes a representation of an object performing a series of movements. The image data may be analyzed to determine movement characteristics, such as speed, angle, direction, etc. of the movements. In some embodiments, the image data may be associated with metadata describing, e.g., a distance from the camera to the object, object size, camera data to convert from an image coordinate system to a world coordinate system, etc. This data may be used to construct a three-dimensional representation of the object shown in the image data. Spatial points and their corresponding movements over time may then be determined from the 3D representation and provided to the AR movement managers as sequence data and/or used by augmented object generation unit 418 to generate an augmented object to be used by the AR movement managers to demonstrate the object's movement to a user.

Figure 5:
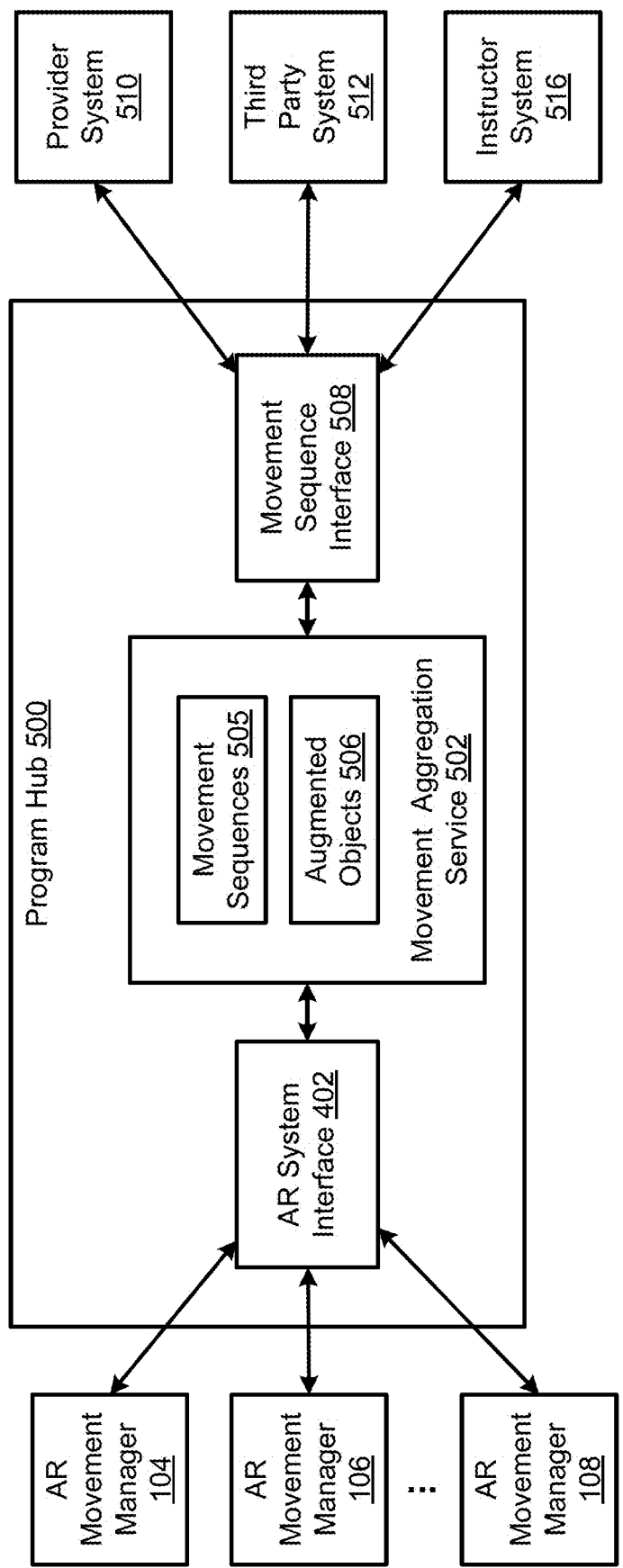
FIG. 5 illustrates an example of a program hub, in accordance with various embodiments of the present invention.

FIG. 5 illustrates an example of a program hub, in accordance with various embodiments of the present invention. As shown in FIG. 5, a program hub 500 may provide a centralized repository for various movement sequences obtained from various providers. For example, movement aggregation service 502 may include movement sequences 504 and augmented objects 506 received from a plurality of sources, such as provider systems 510 (e.g., including doctor-defined exercise regimens), third party systems 512 (e.g., commercial exercise providers, video game systems, etc.), and instructor systems 514 (e.g., including movements designed by various exercise instructors, such as yoga instructors, Pilates instructors, aerobics instructors, and/or other physical activity instructors). In some embodiments, each source may provide their movement sequences to be aggregated through movement sequence interface 508. Movement sequence interface 508 may include a web interface through which a provider or other source can upload their movement sequence. Each movement sequence can be associated with a description of the movement sequence (e.g., type of movement, exercise goals, treatment strategies, etc.).

These movements may then be aggregated by movement aggregation service 502. In some embodiments, movement aggregation service 502 can index each movement by its source and/or description (or keywords derived from the description). A user of an AR movement manager may then access the movement aggregation service 502 through an interface, such as AR system interface 402 or a different interface specific to the program hub 500. The interface may also be a web interface through which the user can search for a desired movement sequence (e.g., by provider, type of movement, etc.) and then download the movement sequence and/or augmented objects to their AR movement manager. This way, program hub 500 acts as a centralized distribution system through which new movements can be added by movement providers and obtained for use by various AR movement managers. In some embodiments, program hub 500, and the functionality described above may be incorporated into program management service 400.

Figure 6:
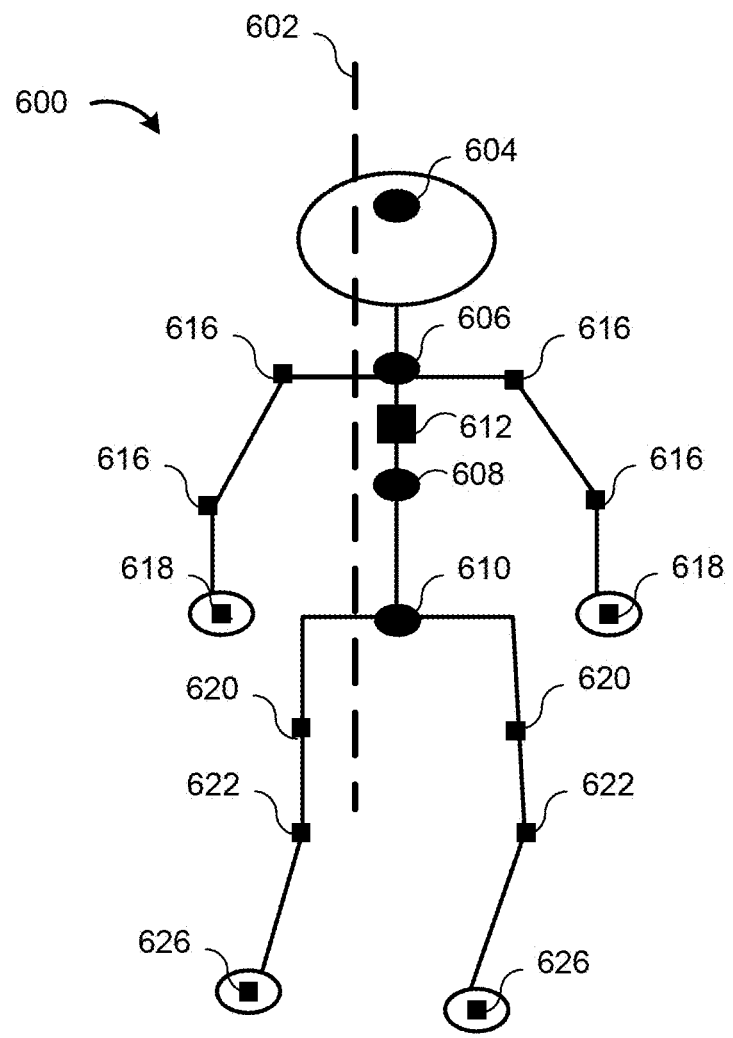
FIG. 6 illustrates an example of a shadow object corresponding to a camera-tracked target, in accordance with various embodiments.

FIG. 6 illustrates an example of a shadow object corresponding to a sensor-tracked target, in accordance with various embodiments. As shown in FIG. 6, a shadow view object 600 may be constructed based on the motion and dimensions of a target and displayed in an augmented reality display device. In some embodiments, feature points of the target may be determined using computer vision and image processing techniques. For example, a plumb line 602 may be using a sensor hub 604 which may be worn by the target. The sensor hub may include accelerometers, gyroscopes, and/or other sensors enabling it to determine the target's plumb line. In some embodiments, sensors 606-626 may be worn by the target, with each sensor collecting position, speed, acceleration, angle, etc. of the target at each location. Each sensor may provide sensor data to sensor hub 604 which may then pass the sensor data to the AR movement manager 100. In some embodiments, each sensor may include one or more feedback mechanisms, enabling feedback to be provided to the user when a sensor is misaligned with a given movement. In some embodiments, feedback may be provided haptically or audibly.

In some embodiments, a training object may be displayed performing different motions. The training object may be similar in shape to the target. For example, the dimensions of the target may be used to construct a similarly sized and proportioned wireframe model. The speed and complexity of the motions performed by the training object may increase based on time (e.g., every X minutes, or Y repetitions, the speed and complexity increase) and/or based on the monitored motion of the target. For example, speed and complexity may continuously increase while the target matches the motion of the training object and may slow as the motion fails to track the training object. The training object and shadow view object 600 may each be displayed as a camera view or eye view, as discussed above.

Figure 7A:
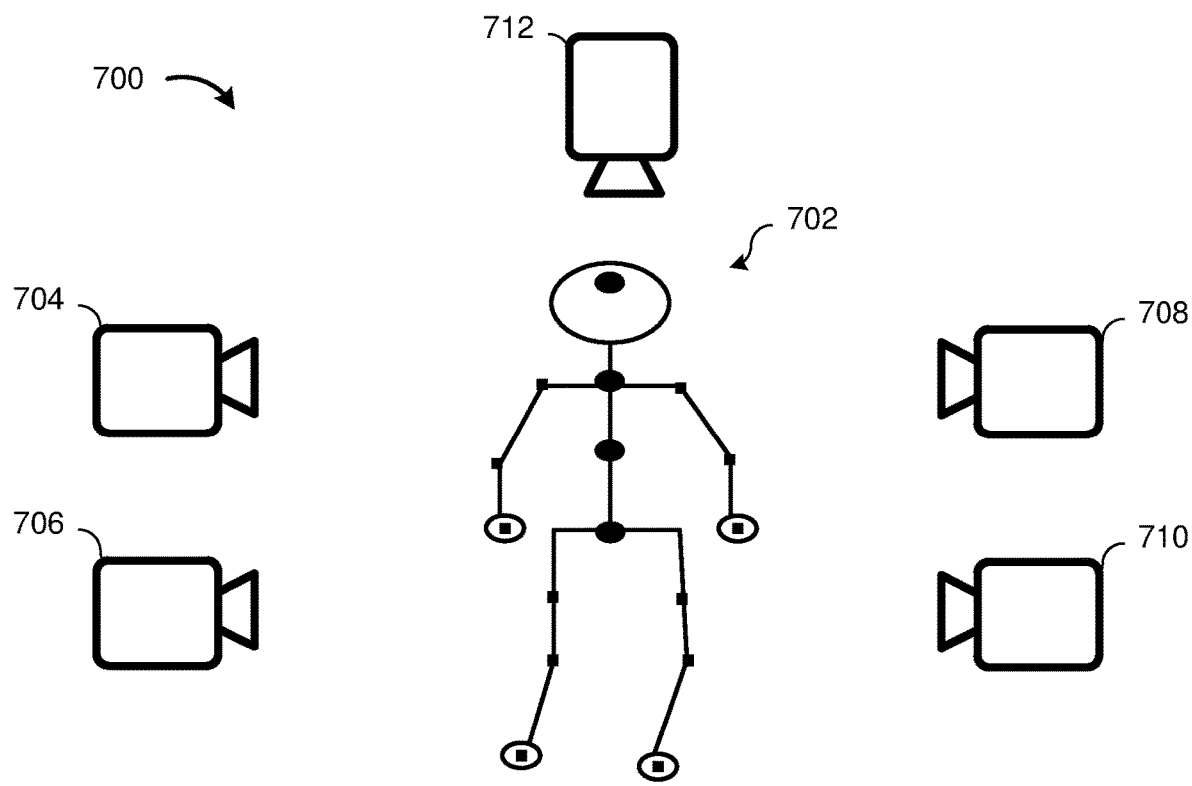
FIGS. 7A and 7B illustrate example camera setups, in accordance with various embodiments.
Figure 7B:
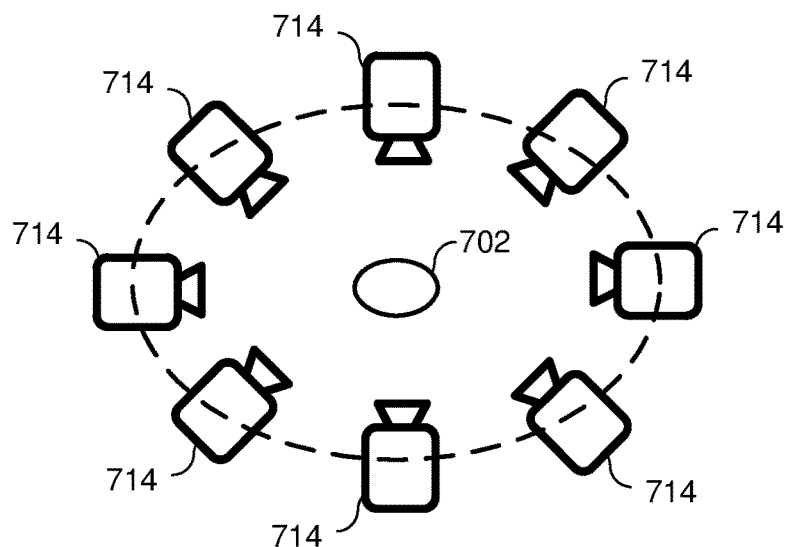

FIGS. 7A and 7B illustrate example camera setups 700, in accordance with various embodiments. As shown in FIG. 7A, the movement of a target 702, such as a user, patient, or other target, may be captured by a plurality of image capture devices. For example, image capture devices may be located at different heights behind (e.g., devices 704 and 706) the target and in front of (e.g., device 708 and 710) the target. Additionally, an overhead image capture device 712 can monitor orientation of the target as it moves in space. For example, based on the orientation of the target, as determined based on the image data captured by image capture device 712, different image capture devices 704-710 may be activated to capture the movement of the target 702. In some embodiments, as shown in FIG. 7B, image capture devices may be arrayed about an area (such as shown by devices 714) in which the target 702 is located. In some embodiments, image data may be captured by all or some of the arrayed image capture devices and the image data used to analyze the movement of the target may be selected based on image processing markers, such as reflectors, identified in the image data. In various embodiments, the image capture devices may include one or more of cameras, video cameras, 3D cameras, or any other image capture device configured to capture image data in one or more spectra of light (e.g., visible, infrared, ultraviolet, etc.). In some embodiments, image data may include video data captured by the one or more image capture devices.

Figure 8:
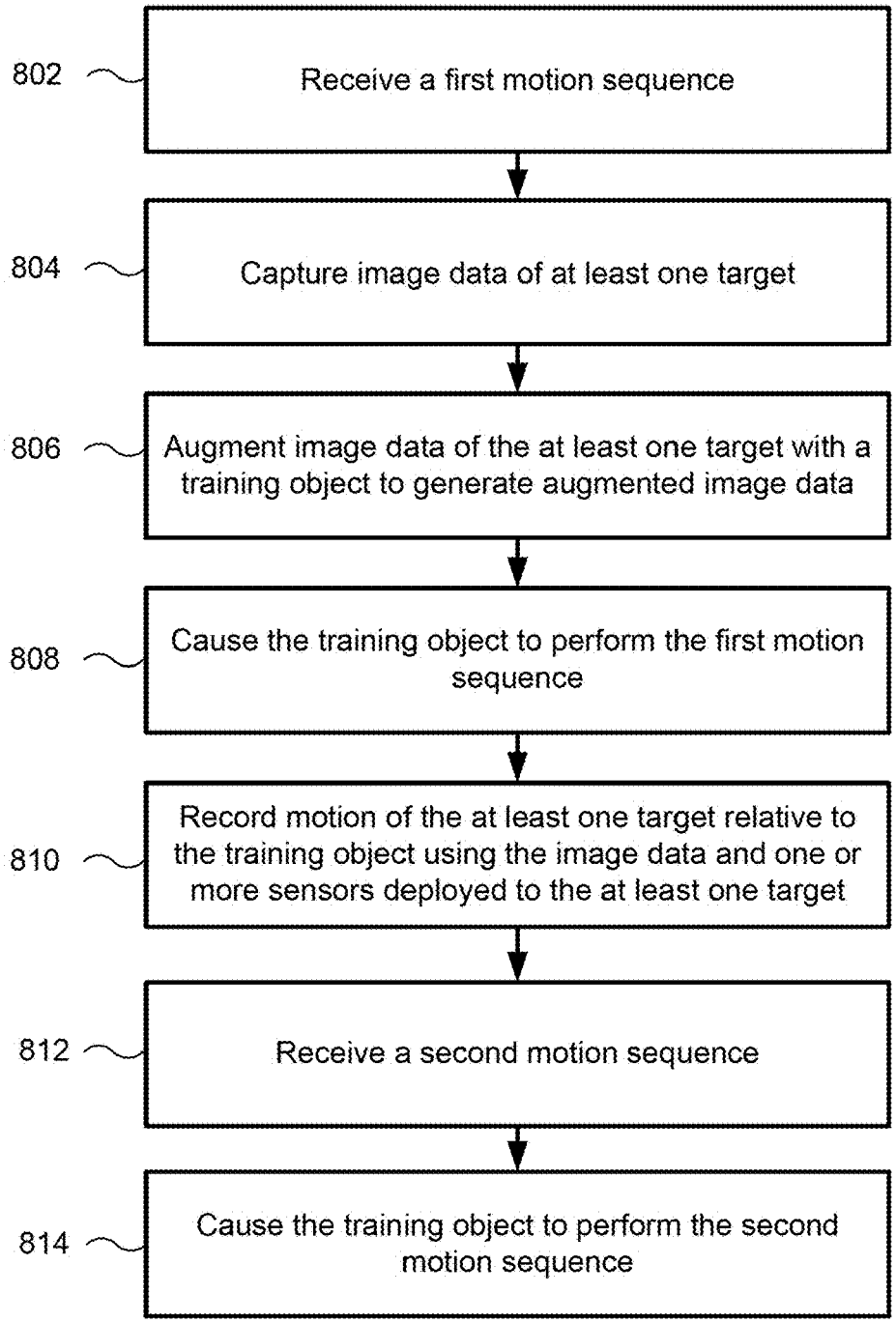
FIG. 8 illustrates an example method, in accordance with various embodiments.

FIG. 8 shows a method 800 of performing movement sequences in an augmented reality environment, in accordance with various embodiments. The method may include, at 802, receiving a first movement sequence. The method may further include, at 804, capturing image data of at least one target. The method may further include, at 806, augmenting the image data with a training object to generate augmented training data.

The method may further include, at 808, causing the training object to perform the first movement sequence. In some embodiments, the at least one movement sequence includes a motion for at least one portion of the at least one target, the portion of the at least one object having at least one of the one or more sensors positioned thereon.

The method may further include, at 810, recording the motion of the at least one target relative to the training object using the image data and one or more sensors deployed to the at least one target. The one or more sensors may include a sensor hub and a plurality of sensors positioned at different locations on the at least one target, each of the plurality of sensors to determine acceleration, angle of incline, and height from the reference plane of at least a portion of the at least one target. In some embodiments, the method may further include receiving sensor data from the sensor hub, the sensor data including the acceleration, angle of incline, and height from the reference plane of at least a portion of the at least one target determined from each of the plurality of sensors and communicated from each of the plurality of sensors to the sensor hub.

The method may further include, at 812, receiving a second movement sequence. The method may further include, at 814, causing the training object to perform the second movement sequence. In some embodiments, the method may further include providing feedback to the target based on a comparison of the motion of the at least one target and the first movement sequence of the training object, wherein the feedback includes one or more of haptic feedback, audible feedback, or visual feedback from at least one sensor based on the comparison of the motion of the target to the at least one movement sequence.

In some embodiments, the method may further include determining a difference between the motion of the at least one target in the image data and the training object, wherein the second movement sequence is received based at least on the difference. In some embodiments, the method may further include performing calibration using a shadow object, wherein the shadow object is displayed in the augmented image data and the at least one target is instructed to perform a calibration movement sequence, recording sensor data from the one or more sensors when the at least one target is at rest and during the calibration movement sequence, identifying one or more feature points of the at least one target, and tracking the one or more feature points during the calibration movement sequence.

Figure 9:
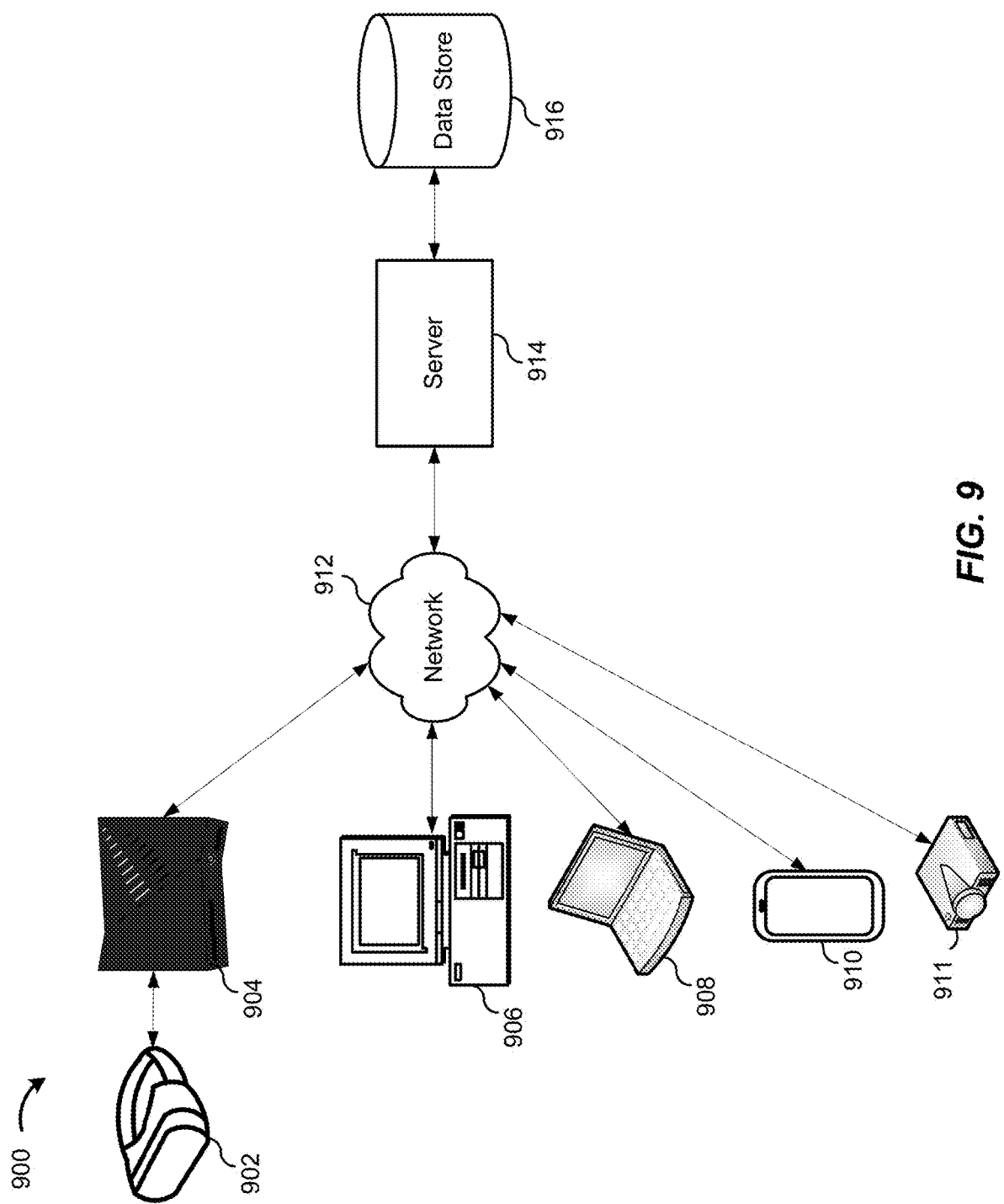
FIG. 9 illustrates an example of a networked system environment, in accordance with various embodiments.

FIG. 9 illustrates an example of a networked system environment, in accordance with various embodiments. As shown in FIG. 9, system environment 900 may include at least one client device 902-910, each of which may execute an application such as an augmented reality/virtual reality application, web browser, or other application. In various embodiments, client devices 902-910 may communicate with at least one server computer 914 over one or more networks 912.

In some embodiments, the client devices 902-910 may include a general purpose personal computer, such as a desktop, laptop, or other personal or workstation computer running one or more operating systems (e.g., Microsoft Windows, Apple macOS, iOS, Android, Unix or Unix-based OS, or other operating systems), and/or a mobile device, including smartphones, tablet computers, or PDAs. In some embodiments, the client devices may include a VR enabled gaming console or computing device, including a head mounted display (HMD). In some embodiments, the client device may include an HMD with all necessary computing resources integrated therein such that a separate computer or gaming console is not required to drive the HMD. In some embodiments, the client devices may include a projection system which includes one or more projectors to project VR or AR images in a room or on one or more display surfaces. The projection system may be driven by a separate computing system connected locally or through network 512 or may include computing resources integrated therein. Although system environment 900 includes six client devices, any number of network-enabled client devices may be supported. Other devices such as devices with sensors, etc. may interact with server 912.

Client devices 902-910 can communicate with at least one server computer over network 910. Network 912 may be any type of network familiar to those skilled in the art that can support data communications using any of a variety of commercially-available protocols, including such as TCP/IP or other suitable protocols. Network 910 may be a wired or wireless local area network (LAN or WLAN), such as an Ethernet network, a wireless network operating using an IEEE 802.11 suite of protocols, the Bluetooth protocol known in the art, and/or any other wireless protocol); and/or any combination of these and/or other networks. Server computer 914 which may include general purpose computers, specialized server computers, server clusters, or any other appropriate computing device capable of running the services and/or applications discussed herein. Server 914 may run an operating system including any of those discussed above and server applications, including HTTP servers, FTP servers, CGI servers, Java servers, database servers, or other server applications.

Server 914 can communicate with one or more data stores 916 which may be located locally at server 914 or may be located remotely and accessed over one or more networks (not shown) or over a storage-area network (SAN). In some embodiments, data store 916 may include one or more databases, such as relational databases, or a storage service, such as an object data store, block data store, or other cloud or network-based storage service.

Figure 10:
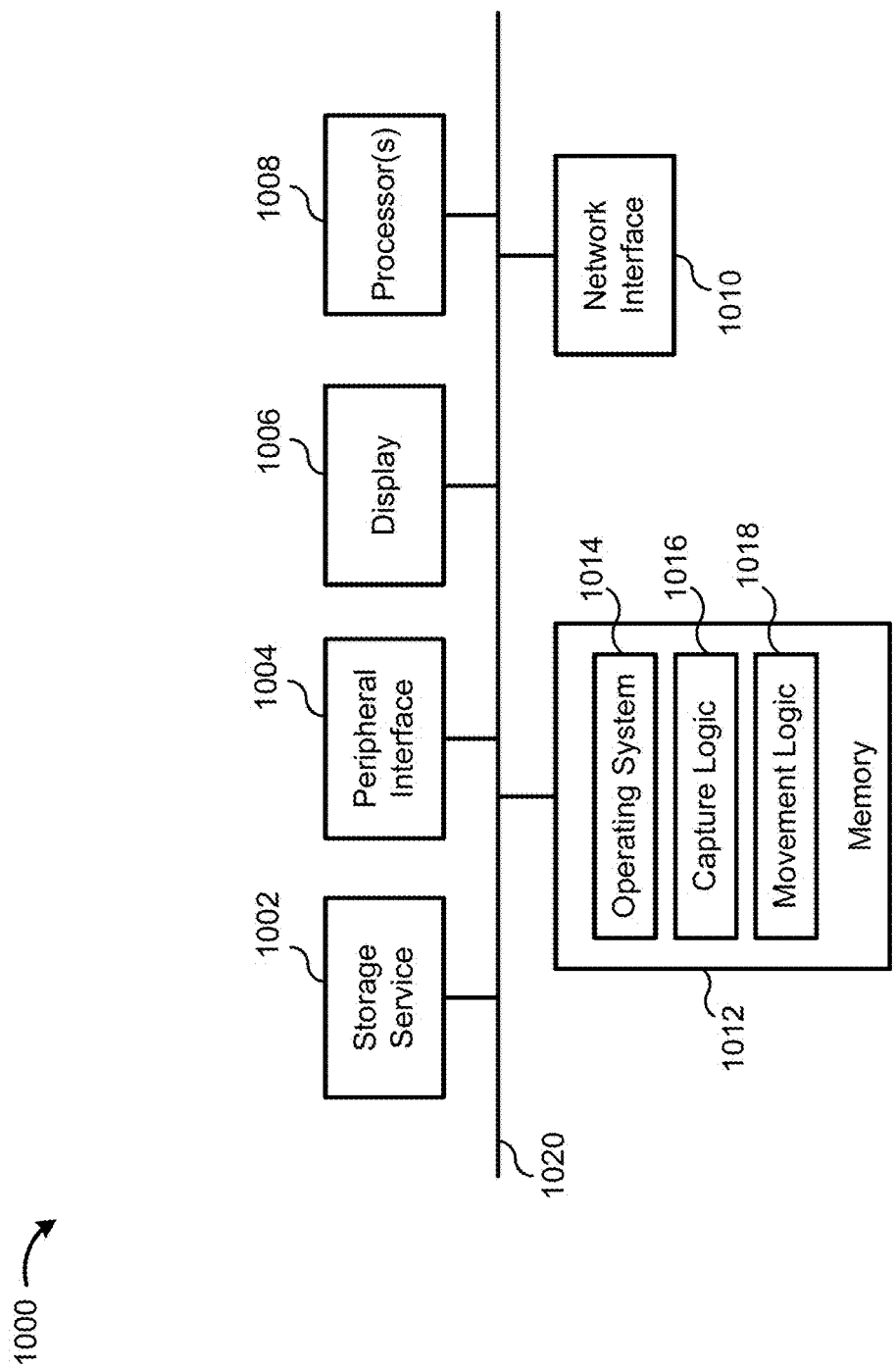
FIG. 10 illustrates an example of a computer system, in accordance with various embodiments of the present invention.

FIG. 10 illustrates an example of a computer system, in accordance with various embodiments of the present invention. For example, the systems discussed herein may be implemented using computer systems such as that shown in FIG. 10. Computer system 1000 can include various components coupled via a bus 1020. The components may include a storage system or storage system interface 1002 which may provide read/write access to one or more non-transitory computer readable storage media. The storage media may be located locally or remotely, and may be accessed directly or through a storage service, such as an object data store, block data store, or other cloud or network-based storage service. The storage media may include devices such as disk drives, optical storage devices, and solid-state storage devices such as a random access memory (RAM) and/or a read-only memory (ROM), which can be programmable, flash-updateable and/or the like.

The computer system may also include a peripheral device interface 1004 which can enable the computer system to communicate with input devices (e.g., a mouse, a keyboard, external storage readers, image capture devices, etc.), and an output device interface 1006 which may provide output to one or more devices, such as a display device, head mounted display, wearable device or sensor, printers, etc. Processors 1008 may include single or multicore CPUs, graphics processing units (GPUs), a digital signal processor (DSP), physics processing units, a special-purpose processor, an application specific integrated circuit (ASIC), application-specific instruction-set processors, field-programmable gate array (FPGA) devices, coprocessors, network processing units, audio processing units, encryption processing units, or other processing device. Computer system 1000 may include a network interface 1010, which may include one or more of a network card, wireless communication module (e.g., 1002.11 compatible wireless module, Bluetooth module, etc.), wired network interface such as an ethernet card, an infra-red communication device, etc.

Computer system 1000 may also include memory 1012 which may include RAM, ROM, EEPROM, flash memory or other memory technology, CD-ROM, digital versatile disk (DVD) or other optical storage, magnetic storage devices, or any other storage medium. Memory 1012 may include software, such as operating system code 1014, application programs such as a client application, Web browser, RDBMS, etc. Memory 1012 may also include applications as discussed herein, such as image capture logic 1016 and motion tracking logic 1018.

Embodiments discussed herein can be implemented in hardware, software, firmware, or combinations thereof. Consequently, features of the present invention may be implemented using a processing system (e.g., including one or more processors). As discussed, embodiments may be implemented using one or more conventional general purpose or specialized digital computer, computing device, machine, or microprocessor, including one or more processors, memory and/or computer readable storage media programmed according to the teachings of the present disclosure. Appropriate software coding can readily be prepared by skilled programmers based on the teachings of the present disclosure, as will be apparent to those skilled in the software art.

In the various embodiments described above, unless specifically noted otherwise, disjunctive language such as the phrase "at least one of A, B, or C," is intended to be understood to mean either A, B, or C, or any combination thereof (e.g., A, B, and/or C). As such, disjunctive language is not intended to, nor should it be understood to, imply that a given embodiment requires at least one of A, at least one of B, or at least one of C to each be present.

While various embodiments of the present invention have been described above, it should be understood that they have been presented by way of example, and not limitation. It will be apparent to persons skilled in the relevant art that various changes in form and detail can be made therein without departing from the spirit and scope of the invention.

What is claimed is:

1. A method, comprising:
    initiating a first session with at least one target;
    receiving a first movement sequence from a progression of movement sequences;
    capturing image data of the at least one target;
    augmenting the image data with a training object to generate augmented training data;
    causing the training object to perform the first movement sequence;
    recording a motion of the at least one target relative to the training object using the image data and one or more sensors deployed to the at least one target;
    receiving a second movement sequence from the progression of movement sequences;
    causing the training object to perform the second movement sequence;
    ending the first session with the at least one target;
    collecting post-session sensor data from the one or more sensors based on movements performed by the at least one target after the first session has ended;
    initiating a second session with the at least one target;
    receiving the post-session sensor data from the one or more sensors; and
    causing the training object to perform a third movement sequence from the progression of movement sequences, the third movement sequence associated with a different difficulty level than the second movement sequence, the different difficulty level selected based on the post-session sensor data.

2. The method of claim 1, wherein the one or more sensors include a sensor hub and a plurality of sensors positioned at different locations on the at least one target, each of the plurality of sensors to determine acceleration, angle of incline, and height from a reference plane of at least a portion of the at least one target.

3. The method of claim 2, further comprising:
    receiving sensor data from the sensor hub, the sensor data including the acceleration, angle of incline, and height from the reference plane of at least a portion of the at least one target determined from each of the plurality of sensors and communicated from each of the plurality of sensors to the sensor hub.

4. The method of claim 1, further comprising:
    providing feedback to the target based on a comparison of the motion of the at least one target and the first movement sequence of the training object, wherein the feedback includes one or more of haptic feedback, audible feedback, or visual feedback from at least one sensor based on the comparison of the motion of the target to the first movement sequence.

5. The method of claim 1, wherein the first movement sequence includes a motion for at least a portion of the at least one target, the portion of the at least one target having at least one of the one or more sensors positioned thereon.

6. The method of claim 1, further comprising:
    determining a difference between the motion of the at least one target in the image data and the training object, wherein the second movement sequence is received based at least on the difference.

7. The method of claim 1, further comprising:
    performing calibration using a shadow object, wherein the shadow object is displayed in the augmented image data and the at least one target is instructed to perform a calibration movement sequence;
    recording sensor data from the one or more sensors when the at least one target is at rest and during the calibration movement sequence;
    identifying one or more feature points of the at least one target; and
    tracking the one or more feature points during the calibration movement sequence.

8. A system, comprising:
    at least one processor;
    a display device connected to the at least one processor;
    one or more sensors deployed to at least one target; and
    an augmented reality movement manager including instructions which, when executed by the at least one processor, cause the augmented reality movement manager to:
    initiate a first session with at least one target;
    receive a first movement sequence from a progression of movement sequences;
    capture image data of the at least one target;
    augment the image data with a training object to generate augmented training data;
    cause the training object to perform the first movement sequence;
    record a motion of the at least one target relative to the training object using the image data and one or more sensors deployed to the at least one target;
    receive a second movement sequence from the progression of movement sequences;
    cause the training object to perform the second movement sequence;
    end the first session with the at least one target;
    collect post-session sensor data from the one or more sensors based on movements performed by the at least one target after the first session has ended;
    initiate a second session with the at least one target;
    receive the post-session sensor data from the one or more sensors; and
    cause the training object to perform a third movement sequence from the progression of movement sequences, the third movement sequence associated with a different difficulty level than the second movement sequence, the different difficulty level selected based on the post-session sensor data.

9. The system of claim 8, wherein the one or more sensors include a sensor hub and a plurality of sensors positioned at different locations on the at least one target, each of the plurality of sensors to determine acceleration, angle of incline, and height from a reference plane of at least a portion of the at least one target.

10. The system of claim 9, wherein the instructions, when executed, further cause the augmented reality movement manager to:
receive sensor data from the sensor hub, the sensor data including the acceleration, angle of incline, and height from the reference plane of at least a portion of the at least one target determined from each of the plurality of sensors and communicated from each of the plurality of sensors to the sensor hub.

11. The system of claim 8, wherein the instructions, when executed, further cause the augmented reality movement manager to:
provide feedback to the target based on a comparison of the motion of the at least one target and the first movement sequence of the training object, wherein the feedback includes one or more of haptic feedback, audible feedback, or visual feedback from at least one sensor based on the comparison of the motion of the target to the first movement sequence.

12. The system of claim 8, wherein the first movement sequence includes a motion for at least a portion of the at least one target, the portion of the at least one target having at least one of the one or more sensors positioned thereon.

13. The system of claim 8, wherein the instructions, when executed, further cause the augmented reality movement manager to:
determine a difference between the motion of the at least one target in the image data and the training object, wherein the second movement sequence is received based at least on the difference.

14. The system of claim 8, wherein the instructions, when executed, further cause the augmented reality movement manager to:
perform calibration using a shadow object, wherein the shadow object is displayed in the augmented image data and the at least one target is instructed to perform a calibration movement sequence;
record sensor data from the one or more sensors when the at least one target is at rest and during the calibration movement sequence;
identify one or more feature points of the at least one target; and
track the one or more feature points during the calibration movement sequence.

15. A non-transitory computer readable storage medium including instruction stored thereon which, when executed by at least one processor, causes the at least one processor to:
initiate a first session with at least one target;
receive a first movement sequence from a progression of movement sequences;
capture image data of the at least one target;
augment the image data with a training object to generate augmented training data;
cause the training object to perform the first movement sequence;
record a motion of the at least one target relative to the training object using the image data and one or more sensors deployed to the at least one target;
receive a second movement sequence from the progression of movement sequences;
cause the training object to perform the second movement sequence;
end the first session with the at least one target;
collect post-session sensor data from the one or more sensors based on movements performed by the at least one target after the first session has ended;
initiate a second session with the at least one target;
receive the post-session sensor data from the one or more sensors; and
cause the training object to perform a third movement sequence from the progression of movement sequences, the third movement sequence associated with a different difficulty level than the second movement sequence, the different difficulty level selected based on the post-session sensor data.

16. The non-transitory computer readable storage medium of claim 15, wherein the one or more sensors include a sensor hub and a plurality of sensors positioned at different locations on the at least one target, each of the plurality of sensors to determine acceleration, angle of incline, and height from a reference plane of at least a portion of the at least one target.

17. The non-transitory computer readable storage medium of claim 16, wherein the instructions, when executed, further cause the at least one processor to:
receive sensor data from the sensor hub, the sensor data including the acceleration, angle of incline, and height from the reference plane of at least a portion of the at least one target determined from each of the plurality of sensors and communicated from each of the plurality of sensors to the sensor hub.

18. The non-transitory computer readable storage medium of claim 15, wherein the instructions, when executed, further cause the at least one processor to
provide feedback to the target based on a comparison of the motion of the at least one target and the first movement sequence of the training object, wherein the feedback includes one or more of haptic feedback, audible feedback, or visual feedback from at least one sensor based on the comparison of the motion of the target to the first movement sequence.

19. The non-transitory computer readable storage medium of claim 15, wherein the first movement sequence includes a motion for at least a portion of the at least one target, the portion of the at least one target having at least one of the one or more sensors positioned thereon.

20. The non-transitory computer readable storage medium of claim 15, wherein the instructions, when executed, further cause the at least one processor to
determine a difference between the motion of the at least one target in the image data and the training object, wherein the second movement sequence is received based at least on the difference.

* * * * *